United States Patent [19]

Teta

[11] Patent Number: 5,411,011
[45] Date of Patent: May 2, 1995

[54] OUTDOOR COOKING DEVICE

[76] Inventor: Jeffrey M. Teta, 78 Avenue C, Port Washington, N.Y. 11050

[21] Appl. No.: 199,743

[22] Filed: Feb. 22, 1994

[51] Int. Cl.⁶ .............................................. F24C 5/00
[52] U.S. Cl. .................................. 126/50; 126/41 R; 126/25 R; 126/24
[58] Field of Search .................. 126/50, 41 R, 42, 24, 126/25 R; 248/539, 222.3, 222.1; 43/21.2

[56] References Cited

U.S. PATENT DOCUMENTS

| | | | |
|---|---|---|---|
| 3,032,783 | 5/1962 | Swanson, Jr. | 126/24 |
| 3,498,284 | 3/1970 | Swaddey | 126/41 |
| 4,729,535 | 3/1988 | Frazier et al. | 126/24 X |
| 5,033,448 | 7/1991 | Sandweg | 126/50 X |
| 5,109,834 | 5/1992 | Collins et al. | 126/41 R |
| 5,120,016 | 6/1992 | Dysarz | 248/539 |
| 5,263,467 | 11/1993 | Jones | 126/42 |

*Primary Examiner*—Larry Jones
*Attorney, Agent, or Firm*—Michael I. Kroll

[57] ABSTRACT

An improved outdoor cooking device is provided, which consists of a barbeque grill. A base is for supporting the barbeque grill. Components are for mounting the support base to a structure in a level stabilized manner, so that the barbeque grill cannot be knocked over when in use.

2 Claims, 2 Drawing Sheets

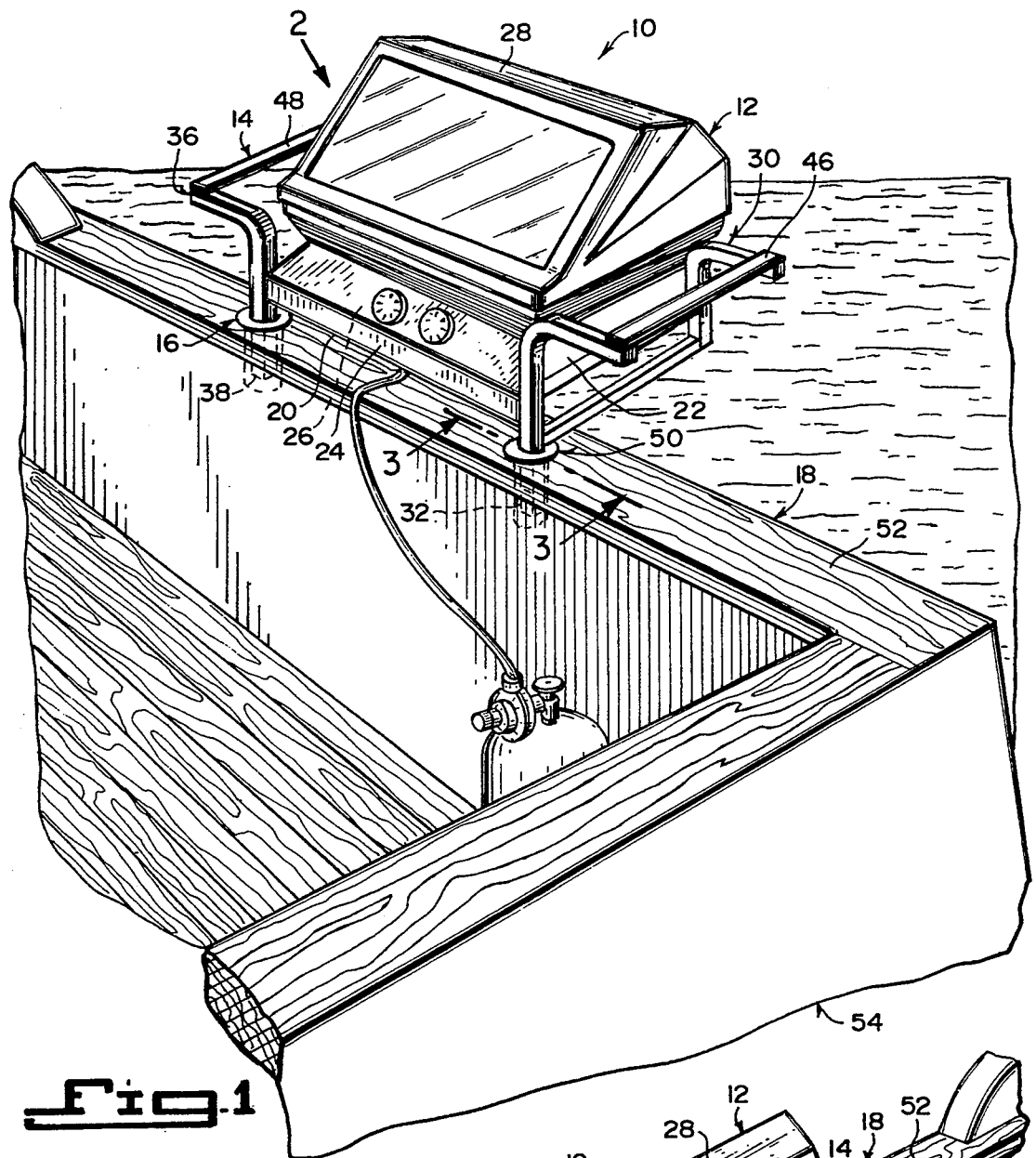
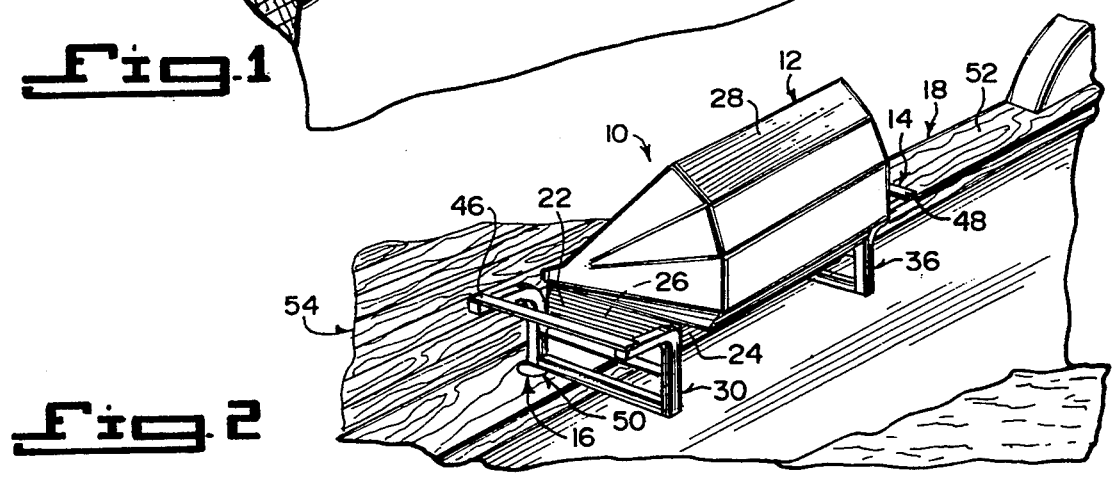

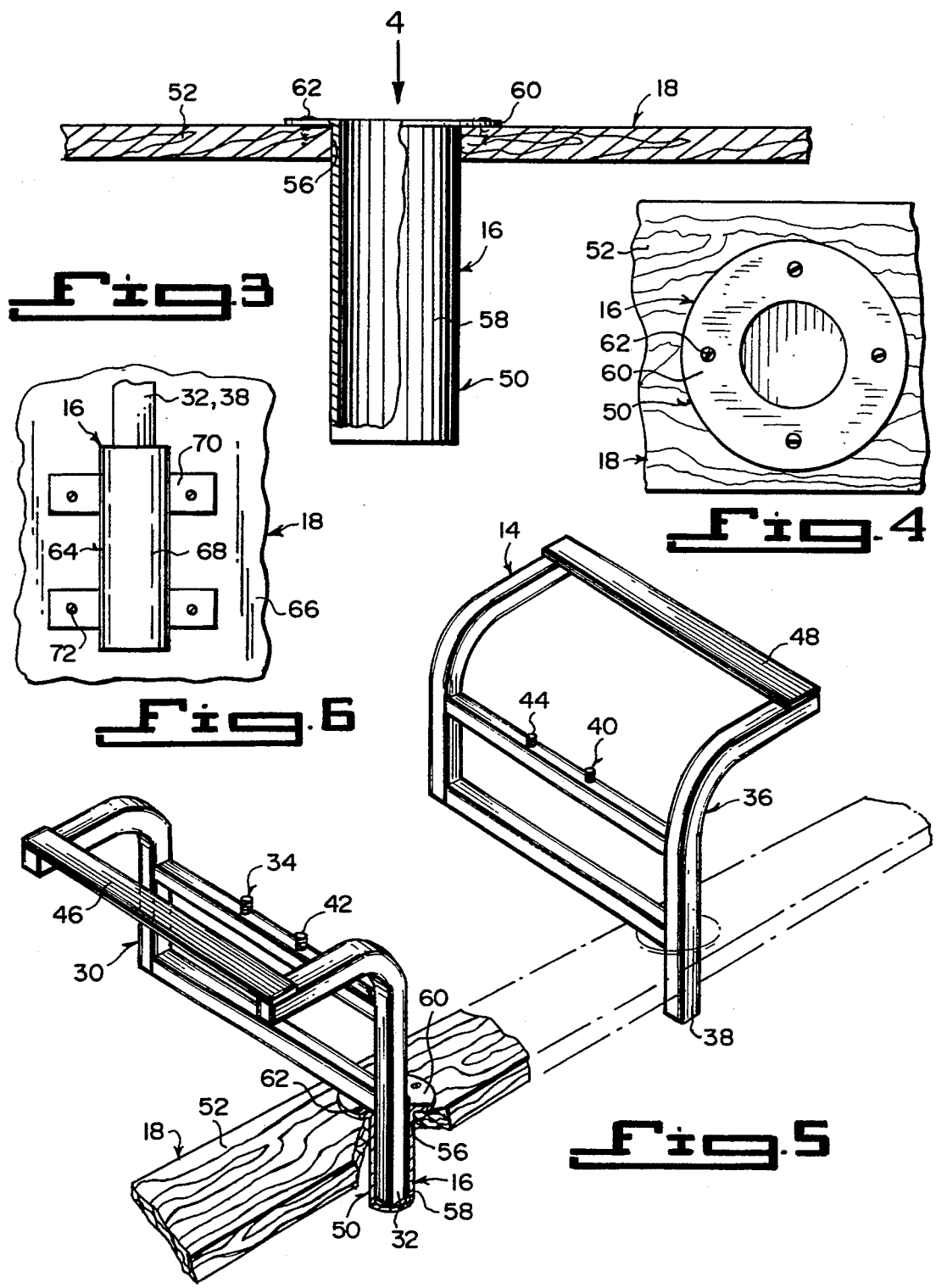

OUTDOOR COOKING DEVICE

BACKGROUND OF THE INVENTION

1. Field of the Invention

The instant invention relates generally to barbecue grill mounts and more specifically it relates to an improved outdoor cooking device.

2. Description of the Prior Art

Numerous barbecue grill mounts have been provided in prior art. For example, U.S. Pat. Nos. 3,032,783 to Swanson, Jr. and 4,729,535 to Frazier et al. are illustrative of such prior art. While these units may be suitable for the particular purpose to which they address, they would not be as suitable for the purposes of the present invention as heretofore described.

Clayton A. Swanson, Jr.

COMBINATION BOAT AND GRILL

U.S. Pat. No. 3,032,783

An outdoor entertainment apparatus having in combination a boat, an outdoor grill and an adjustable mounting structure secured to the exterior of the boat and extending between the boat and the grill, mounting the latter upon the boat in laterally spaced relation exteriorly thereof in fixed relation to the boat. The structure is adjustable to permit the grill to be alternatively moved between a position immediately adjacent the boat and a relatively remote position. Food may be prepared upon the grill without endangering the safety and comfort of the passengers of the boat when in the latter position and may be attended by a boat passenger when the grill is in the former position.

Stanley J. Frazier

Blaine F. Sorenson

APPARATUS FOR SUPPORTING A COOKING DEVICE

U.S. Pat. No. 4,729,535

An assembly for supporting a cooking device, such as a barbecue, including a main platform and folding end platforms. The main platform is connected to a shaft which in turn is mounted to a conventional structure such as the rail of a boat by means of a mounting bracket. The support assembly which supports the cooking device thereon, is secured in a level manner above the ground or water. Repositioning of the main platform and end platforms relative to the mounting bracket is accompanied by slideably mounting the main platform to the support shaft. When it is desired to store the support assembly when not in use, the end platforms are folded inward to locations atop the main platform. The mounting bracket and shaft are moved inward toward the main platform and the support assembly is stored inside the cooking device.

SUMMARY OF THE INVENTION

A primary object of the present invention is to provide an improved outdoor cooking device that will overcome the shortcomings of the prior art devices.

Another object is to provide an improved outdoor cooking device that can be mounted to an upstanding structure, so that it cannot be knocked over when used.

An additional object is to provide an improved outdoor cooking device that is removable for safe storage while traveling.

A further object is to provide an improved outdoor cooking device that is simple and easy to use.

A still further object is to provide an improved outdoor cooking device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view of the instant invention mounted upon a gunwale of a boat.

FIG. 2 is a rear perspective view taken in the direction of arrow 2 in FIG. 1.

FIG. 3 is an enlarged cross sectional view taken along line 3—3 in FIG. 1, with parts in elevation showing one of the top mount leg holders in greater detail.

FIG. 4 is a top view taken in the direction of arrow 4 in FIG. 3.

FIG. 5 is a rear perspective view, showing the support frame members with the barbecue grill removed and parts broken away.

FIG. 6 is an elevational view showing a side mount leg holder attached to a vertical flat structure receiving one depending leg of one support frame member.

DETAILED DESCRIPTION OF THE PREFERRED EMBODIMENTS

Turning now descriptively to the drawings, in which similar reference characters denote similar elements throughout the several views, FIGS. 1 and 2 illustrate an improved outdoor cooking device 10, which consists of a barbeque grill 12. A base 14 is for supporting the barbeque grill 12. Components are for mounting the supporting base 14 to a structure in a level stabilized manner, so that said barbeque grill cannot be knocked over when in use.

The barbeque grill 12 contains a bottom wall 20. A pair of opposing end walls 22 extends upwardly from the bottom wall 20. A pair of opposing side walls 24 extend upwardly from the bottom wall 20, so as to form an interior cooking chamber 26. The barbeque grill 12 further includes a hood 28 hinged thereto over the interior cooking chamber 26.

The supporting base 14, as best seen in FIG. 5, includes a first frame member 30 having a first depending leg 32. First elements 34 are for attaching the first frame member 30 to an underside of the bottom wall 20 at a first side thereof. A second frame member 36 is also provided, having a second depending leg 38. Second elements 40 are for attaching the second frame member 36 to the underside of the bottom wall 20, at a second side thereof, so that the first depending leg 32 and the second depending leg 38 can engage with the mounting components 16.

The first attaching elements 34 are a first pair of spaced apart upstanding studs 42 on the first frame member 30, to extend into the underside of the bottom wall 20 at the first side thereof. The second attaching elements 40 are a second pair of spaced apart upstanding studs 44 on the second frame member 36, to extend into the underside of the bottom wall 20 at the second side thereof.

The supporting base further includes the first frame member 30 having a first handle 46 thereon. The second frame member 36, also has a second handle 48 thereon. A person can grip the first handle 46 and the second handle 48 and carry the barbeque grill 12 therefrom, allowing the first depending leg 32 and the second depending leg 38 to engage with the mounting components 16.

The mounting components 16 in FIGS. 1 through 5, consists of a pair of top mount leg holders 50. The structure 18 is a gunwale 52 of a boat 54 having a pair of spaced apart wells 56 to receive the top mount leg holders 50. The first depending leg 32 and the second depending leg 38 can enter and be retained by the pair of top mount leg holders 50. Each top mount leg holder 50 includes a cup 58, to fit into one of the wells 56 in the gunwale 52. A flange 60 extends about an upper edge of the cup 58, to sit upon the gunwale 52 about the well 56. A plurality of fasteners 62 to extend through the flange 60 and into the gunwale 52.

The mounting components 16 can also be a pair of side mount leg holders 64, one of which is shown in FIG. 6. The structure 18 is a vertical wall 66, to receive the side mount leg holders 64. The first depending leg 32 and the second depending leg 38 can enter and be retained by the pair of side mount leg holders 64.

Each side mount leg holder 64 consists of a cup 68, with a plurality of spaced apart transverse flat arm plates 70 affixed to the back of the cup 68. A plurality of fasteners 72 extend through the flat arm plates 70 and into the vertical wall 66.

The flat wall 66 can be a railing of a deck on a house, a side of a mobile trailer, a railing of a terrace in a high rise apartment or an exterior wall of a building. The barbeque grill 12, the supporting base 14 and the mounting components 16 are all fabricated out of durable metal fireproof materials.

LIST OF REFERENCE NUMBERS 10 improved outdoor cooking device
12 barbeque grill
14 supporting base
16 mounting components
18 structure
20 bottom wall of 12
22 end wall of 12
24 side wall of 12
26 interior cooking chamber in 12
28 hook of 12
30 first frame member
32 first depending leg on 30
34 first attaching elements for 30
36 second frame member
38 second depending leg on 36
40 second attaching elements for 36
42 upstanding stud of 34
44 upstanding stud of 40
46 first handle on 30
48 second handle on 36
50 top mount leg holder for 16
52 gunwale for 18
54 boat
56 well in 52
58 cup of 50
60 flange of 50
62 fastener
64 side mount leg holder for 16
66 vertical wall for 18
68 cup of 64
70 flat arm plate on 68
72 fastener It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and is desired to be protected by Letters Patent is set forth in the appended claims:

1. An improved outdoor cooking device which comprises:
   a) a barbeque grill, said barbeque grill including a bottom wall, a pair of opposing end walls extending upwardly from said bottom wall, and a pair of opposing side walls extending upwardly from said bottom wall, so as to form an interior cooking chamber, said barbeque grill further including a hood hinged thereto over said interior cooking chamber;
   b) means for supporting said barbeque grill, said supporting means including a first frame member having a first depending leg, means for attaching said first frame member to an underside of said bottom wall at a first side thereof, a second frame member having a second depending leg, and means for attaching said second frame member to the underside of said bottom wall at a second side thereof, so that said first depending leg and said second depending leg can engage with said mounting means, said first attaching means including a first pair of spaced apart upstanding studs on said first frame member, to extend into the underside of said bottom wall at the first side thereof, said second attaching means including a second pair of spaced apart upstanding studs on said second frame member to extend into the underside of said bottom wall at the second side thereof, said supporting means further including said first frame member having a first handle thereon, and said second frame member having a second handle thereon, so that a person can grip said first handle and said second handle and carry said barbeque grill therefrom, allowing said first depending leg and said second depending leg to engage with said mounting means; and
   c) means for mounting said supporting means to a structure in a level stabilized manner, so that said barbeque grill cannot be knocked over when in use, said mounting means including a pair of top mount leg holders and the structure being a gunwale of a boat having a pair of spaced apart wells to receive said top mount leg holders, so that said first depending leg and said second depending leg can enter and be retained by said pair of top mount leg holders, said mounting means including a pair of side mount leg holders and the structure being a vertical wall to receive said side mount leg holders, so that said first depending leg and said second depending leg can enter and be retained by said pair of side mount leg holders, each said side mount leg holder including a cup, a plurality of spaced apart transverse flat arm plates affixed to the back of said cup, and a plurality of fasteners to extend through said flat arm plates and into the vertical wall.

2. An improved outdoor cooking device as recited in claim 1, wherein each said top mount leg holder includes:
 a) a cup to fit into one of the wells in the gunwale;
 b) a flange extending about an upper edge of said cup to sit upon the gunwale about the well; and
 c) a plurality of fasteners to extend through said flange and into the gunwale.

* * * * *